US008114257B2

(12) United States Patent
Thompson

(10) Patent No.: US 8,114,257 B2
(45) Date of Patent: Feb. 14, 2012

(54) ELECTROLYTIC CELL AND METHOD OF REDUCING GAMMA RAY EMISSIONS

(75) Inventor: John A. Thompson, Nassau (BS)

(73) Assignee: Charles E. Entenmann, Key Largo, FL (US)

( * ) Notice: Subject to any disclaimer, the term of this patent is extended or adjusted under 35 U.S.C. 154(b) by 966 days.

(21) Appl. No.: 12/148,889

(22) Filed: Apr. 23, 2008

(65) Prior Publication Data

US 2009/0266708 A1 Oct. 29, 2009

(51) Int. Cl.
*C25B 9/00* (2006.01)
*G01T 1/00* (2006.01)

(52) U.S. Cl. ..................... 204/242; 204/237; 204/228.5; 204/275.1; 204/263; 204/265; 250/269.3; 250/370.09

(58) Field of Classification Search .................. 204/242, 204/237, 275.1, 263, 265, 284, 228.5; 250/370.09, 250/269.3

See application file for complete search history.

(56) References Cited

U.S. PATENT DOCUMENTS 5,318,675 A 6/1994 Patterson
5,372,688 A 12/1994 Patterson

*Primary Examiner* — Harry D Wilkins, III
*Assistant Examiner* — Zulmariam Mendez
(74) *Attorney, Agent, or Firm* — Charles J. Prescott

(57) ABSTRACT

An electrolytic cell and a method for accelerating the reduction of gamma ray emissions from a radioactive substance. The cell includes a non-conductive housing and a conductive end member sealingly positioned in and extending from each open end of the housing. Gamma ray emitting material such as powder, granules or gases in an admixture with palladium black powder or particles are closely packed into the chamber. A longitudinal gas passage extends through each end member in gas communication with the chamber. Each gas passage is sealably closeable, one gas passage being connectable to a source of pressurized hydrogen or deuterium gas deliverable under pressure into the chamber to charge the catalytic particles. A distal end of each end member is connected to an electric power source wherein, when electric current flows through the chamber, the gamma ray emission count decays at an abnormally high rate.

3 Claims, 2 Drawing Sheets

ELECTROLYTIC CELL AND METHOD OF REDUCING GAMMA RAY EMISSIONS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to electrolytic cell 10s and more particularly to a method of using electrolytic cell utilizing a gaseous electrolyte within a sealed chamber filled with a mixture of packed palladium black powder and gamma ray emitting powder by passing an electric current therethrough.

2. Description of Related Art

The utility of converting electric current into heat for external use is obvious and well known. Common electrolytic cells utilizing a water-based electrolyte wherein an electric current passes through the liquid electrolyte flowing through or held within the electrolytic cell to produce the chemical breakdown of water into hydrogen and oxygen and the production of heat as a byproduct are also well known.

If a process by which the measured output of gamma rays (from a contained source of radio-nuclei) could be decreased (without shielding), the process could be of benefit, Since gamma rays (or gamma photons) are the most penetrating of the entire EMF spectrum (after cosmic rays), then exposure to them by all life will lead to subsequent damage of biological nucleic acids (DNA or RNA), as well as other cellular processes. This phenomenon is put to use by means of gamma sterilization (using cobalt-60 as a source) in the medical and food industries.

Throughout the nuclear industry, great care is taken to prevent general exposure to gamma rays, especially in nuclear power generation and the handling of radioactive materials during the fuel cycle processes. At the end of this cycle, there remains radioactive elements with high gamma ray outputs which must be sequestered and shielded from the biosphere for many years.

Experiments performed over the past six months in Nassau, Bahamas have apparently demonstrated reduced gamma emission from a radium-226 source.

The present invention utilizes a form of electrolytic cell having a gaseous electrolyte in the form of hydrogen or deuterium gas and catalytic particles comprising palladium black powder combined with gamma ray emitting radioactive particles, powder or liquid such as a radium nitrate solution uniformly blended into a dried admixture with the palladium black. The mixture is chambered within a non-conductive housing and compacted and held within the housing by conductive end members which are sealingly engaged within the preferably cylindrically configured non-conductive housing. By passing electrical current through the chamber containing the radioactive mixture and hydrogen or deuterium gas, gamma ray emissions are reduced.

BRIEF SUMMARY OF THE INVENTION

This invention is directed to an electrolytic cell and a method for accelerating the reduction of gamma ray emissions from a radioactive substance, the cell comprising a non-conductive housing and a conductive end member sealingly positioned in and extending from each open end of the housing. The end members have spaced apart proximal ends to define, in cooperation with said housing, a chamber. Radioactive gamma ray emitting powder or granules in an admixture with palladium black powder or particles are closely packed into the chamber and against each proximal end. A longitudinal gas passage extends through each end member in gas communication with the chamber. Each gas passage is sealably closeable, one gas passage being connectable to a source of pressurized deuterium gas deliverable under pressure into the chamber to charge the catalytic particles. A distal end of each end member is connected to an electric power source wherein, when electric current flows through the end members and across the chamber which is filled with the admixture and hydrogen or deuterium gas, the gamma ray emission count decays at an abnormally high rate.

It is therefore an object of this invention to provide a gaseous electrolyte electrolytic cell for accelerating the decay of radioactive material.

It is yet another object of this invention to use a hydrogen or deuterium gas electrolyte activated electrolytic cell for reducing the gamma ray emission of a radioactive material.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
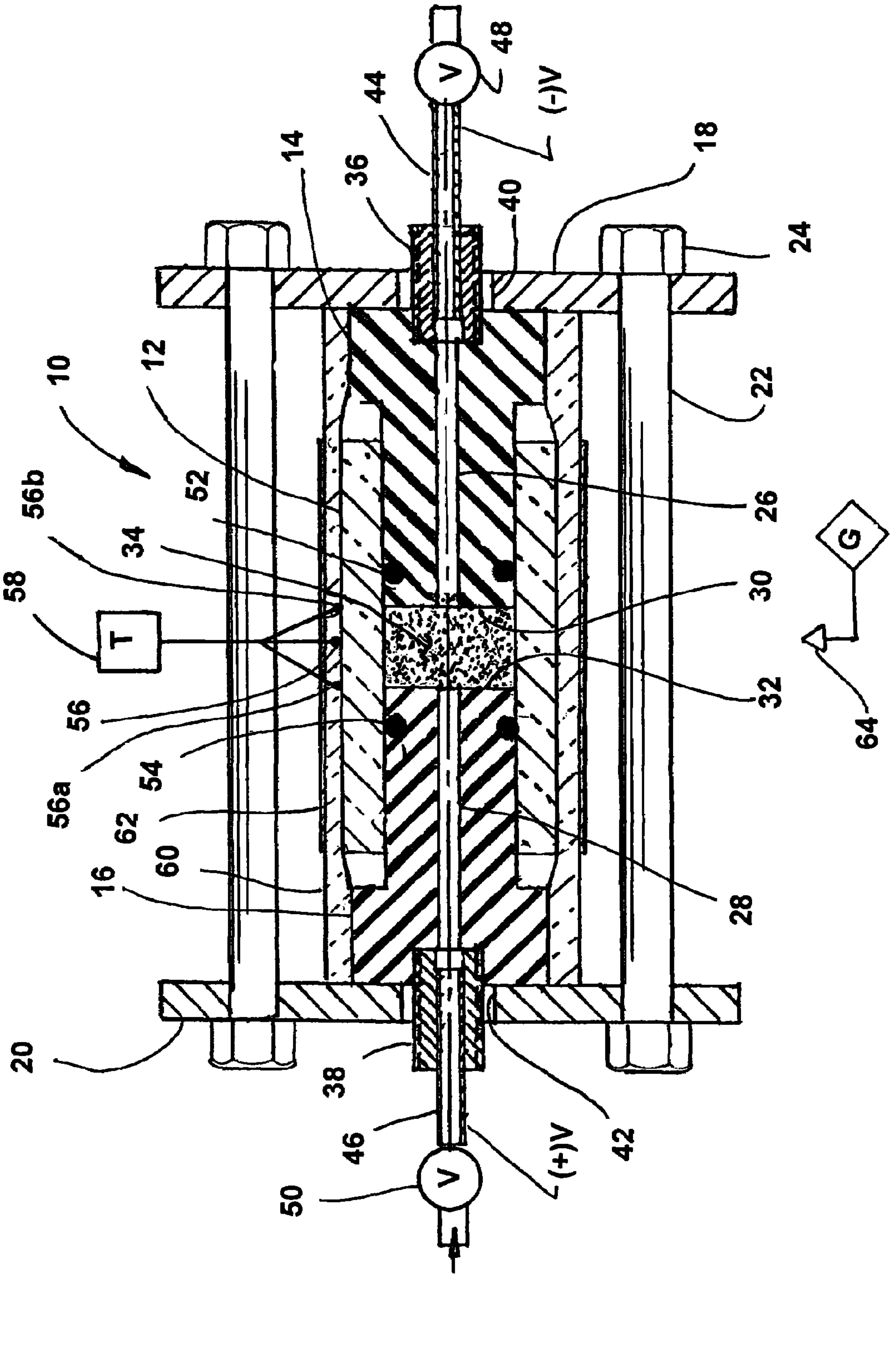
FIG. 1 is a section view through an electrolytic cell 10 for use in accordance with the present invention.

Referring now to FIG. 1, an electrolytic cell 10 in accordance with the present invention is there shown generally at numeral 10. This cell 10 includes a non-conductive cylindrical housing shown generally at numeral 12 and open at each end thereof. This housing 12 is formed of vitreous lab-quality glass having a wall thickness of 2 mm, an outside diameter of 11 mm, and a length of 3 cm, producing a chamber volume of 7.63 $cm^3$.

Conductive (preferably brass) end members 14 and 16 are fitted into each end of the housing 12 and are sealably engaged against the inside diameter of the tubular housing 12 by elastomeric O-rings 54. End plates 18 and 20 are positioned against the outer ends of each of the end members 14 and 16, respectively, and are held substantially parallel one to another and spaced apart by elongated threaded fasteners 22 which are spaced apart in a triangular or rectangular pattern as desired.

Conductive brass adaptors 36 and 38 are fitted into threaded engagement with mating apertures in each end of each end member 14 and 16, respectively. These adaptors 36 and 38 have a longitudinally extending aperture therethrough into which conductive tubular extensions 44 and 46 are sealably engaged and longitudinally extending therefrom as shown in FIG. 1. Each of the end members 14 and 16 further include a longitudinally extending passageway 26 and 28, respectively, which are each in fluid communication with the extension tubes 44 and 46, respectively.

A closely packed admixture of gamma ray emitting powder or particles 34 is positioned between the proximal end faces of each of the end members 14 and 16. Details of the composition of these catalytic particles 34 and the method of compressing them are discussed herebelow.

A d.c. or a.c. voltage source is applied during operation of the cell 10 between each of the conductive tubular extensions 44 and 46. The chamber which contains the catalytic particles 34 may be completely closed to atmosphere by valves 48 and 50 during calibration and operation of the cell 10 or may be opened to introduce the hydrogen or deuterium gas during charging of the cell 10 10. The charging process will be described more fully herebelow.

A thermocouple 56 is placed directly against the outer surface of the non-conductive housing 12 and in close proximity to the center of the catalytic particles 34. A temperature read out 58 is provided which will read the surface temperature of the housing 12.

A layer of insulation 60, although now not preferred, is wrapped around the housing 12 and the exposed outer surfaces of each of the end members 14 and 16 up to each of the end plates 18 and 20 as shown. This insulation 60 is held in place by at least one wrap of non-conductive tape 62 such as duct tape and is provided for more accurate and consistent temperature readings.

This mechanism and the catalytic particles 34 are formed as an admixture of nano-palladium black and zirconium oxide, with a solution of radium nitrate added to this admixture, and then dried. This now radioactive particle mixture 34 is placed into the chamber of the electrolytic cell 10 and a gamma ratemeter G probe 64 placed in close proximity, with the distance of the probe 64 window and it's geometrical relationship to the cell 10 remaining unchanged at approximately 1 cm from the side of the cell 10 throughout the experiment.

Decay of Radium-226

Radium-226 is the decay daughter of thorium-230, and the fifth daughter of uranium-238. By means of alpha particle and gamma emission, Ra-226 decays to radon-222 and has a half-life of 1600 years (about 1% of the Ra-226 is transmuted to radon-222 in 25 years), with the final decay product being lead-206 (stable) after seven more decay steps.

Figure 2:
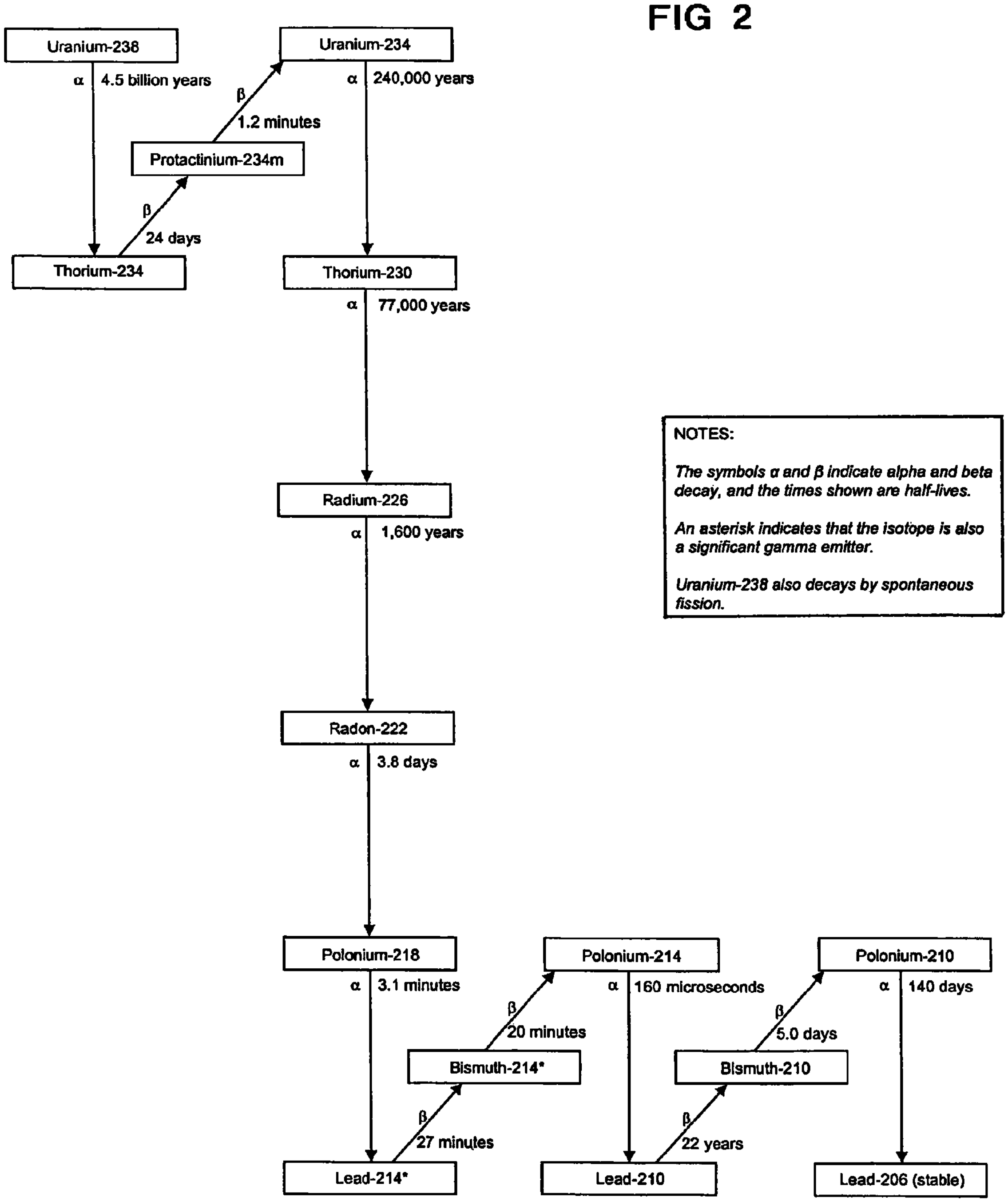
FIG. 2 is a diagram of Uranium 238 decay.

An excellent diagram of U-238 decay series from Argonne National Laboratory is reproduced in FIG. 2. Starting at radium-226, about halfway down the diagram, the following decay series is shown:

radium-226 ➤radon-222 ➤polonium-218 ➤lead-214 ➤ bismuth-214 ➤polonium-214 ➤lead-210 ➤bismuth-210 ➤ polonium-210 ➤lead-206 (stable)

The modes of decay and half-lives are as follows:

TABLE 1

| | | |
|---|---|---|
| Ra-226 | alpha | 1600 years |
| Rn-222 | alpha | 3.8 days |
| Po-218 | alpha | 3.1 minutes |
| Pb-214 | beta | 27 minutes |
| Bi-214 | beta | 20 minutes |
| Po-214 | alpha | 160 microseconds |
| Pb-210 | beta | 22 years |
| Bi-210 | beta | 5.0 days |
| Po-210 | alpha | 140 days |

The major gamma emitters in this series are Pb-214 and Bi-214.

Gamma Emitting Material

An extremely fine palladium black was prepared by dissolving 20 grams of palladium chloride in 200 mls of distilled water (acidified to ~pH 2 with HCl). Approximately 50 grams of zinc metal shavings were added to the beaker, and then allowed to stand for a one week. The reduced Pd black powder (formed around the zinc) was vigorously stirred into the solution and then poured into another beaker, leaving the unreacted zinc behind. The Pd black solution was then allowed to settle, the supernatant siphoned off, and replaced with 200 mls distilled water and allowed to settle again.

This process was repeated ten (10) times in order to rid the solution of zinc ions, avoiding filtration. The reason for not filtering the Pd black out of the solution using paper was to avoid losing the finer particles through the paper. After the final siphoning, the wet Pd black was transferred to an evaporating dish, and dried in a vacuum over calcium chloride. The resulting Pd black produced in this manner is extremely fine, and is called nano-Pd.

After drying, the 2.5 grams of the nano-Pd was thoroughly mixed with 5.5 grams of zirconium oxide powder (ZnO). An aliquot of radium nitrate solution was then combined with the powder mixture, which was then dried at 70C, then re-ground in a mortar.

The powder described above was prepared on 19 Jul., 2007, and then stored in a capped plastic tube, about ten times its volume.

Chamber Loading

Approximately 2.63 gm of one of the above-described radioactive powder 34 was loaded into the chamber formed between the proximate opposing faces 30 and 32 of each of the conductive end members 14 and 16 within the cylindrical housing 12. The particles 34 were placed within the chamber in several stages or layers totaling more than one and preferably five to ten layers. A small quantity (approximately ⅕ of the total of the catalytic particles) was placed into the chamber with the cylindrical housing 12 in an upright orientation and only one of the end members 14 or 16 in place. The particles 34 were tamped with a 1 kg load for approximately 2-5 minutes after each layer of the conductive particles were placed within the chamber. The total length of the chamber was approximately 10 mm.

After both end members 14 and 16 were in position and the end plates 18 and 20 held as shown in FIG. 1, slight tightening of the elongated threaded fasteners 22 at 24 was effected. This further compressed the conductive particles 34 and secured the end members 14 and 16 in proper positioning within the housing 12. A resistance of in the range of 10-150 ohms was targeted.

To insure a sealed chamber, approximately 100 p.s.i. of either hydrogen ($H_2$) or deuterium ($D_2$) gas was introduced into one of the tubular extensions 46 through valve 50 as shown by the arrow, while the other valve 48 was closed. The pressurized hydrogen or deuterium gas within the chamber was allowed to sit in the pressurized condition for approximately twenty-four hours.

The gamma ratemeter probe placed 1.0 cm from the outer glass wall of the cell 10. Since alpha and beta radiation cannot penetrate the glass, any radiation registered was due to gamma. The basic idea of the experiment was to let the powder sit in the cell 10, while counting the gammas daily as the daughters came to equilibrium, especially Pb214 and Bi-214 since they are major gamma emitters. In the tight confines of the closed cell 10, the Rn-222 (some of it gaseous) is trapped, and on it's subsequent decay to Po-218 (a metal), is adsorbed onto particles nearby [see CRC, Handbook of Physics and Chemistry, Radon, 1968-1967, pg. B-132]. All gamma counting was done using a Technical Associates Rate-meter/Sealer (Canoga Park, Calif.), model #PRS-5 and Probe model #BGS 251. Counting was performed for 30, 60 and 90 minute periods several times per day, and the CPM calculated by hand. The average daily gamma counts observed were as follows:

TABLE II

| DAY | CPM (counts per minute) |
|---|---|
| 1 | 1320 |
| 2 | 1443 |
| 3 | 1614 |
| 4 | 1625 |
| 5 | 1694 |
| 6 | 1778 |
| 7 | 1789 |
| 8 | 1856 |
| 18 | 1977 |
| 20 | 1995 |
| 21 | 1997 |
| 23 | 1992 |
| 26 | 1962 |
| 27 | 2041 |
| 28 | 1942 |
| 35 | 1946 (before deuterium gas admission/ voltage/current applied) |
| 35 | 1621 (after deuterium gas admission/ voltage/current applied) |

Deuterium Gas Admission ($D_2$), Voltage (V) and Current (T)

Before the addition of $D_2$, the cell 10 resistance (R) was 150,000 ohms. After the $D_2$ addition, R dropped to 20 ohms. This drop in R is due to the swelling of the Pd particles as they absorb the $D_2$ gas. After the $D_2$ addition, a power (P) of 5 watts was applied, V=10 volts, I=0.5 amps for several hours. Applied power varied over subsequent days varied in time between approximately 3 to 9 hours per day, and 1 to ten watts.

The cell 10 temperature never exceeded 220 degrees C. (average of three (3) thermocouples 56, 56*a* and 56*b* attached to the outside of the glass body). The $D_2$ pressure in the cell 10 was maintained at between 1 psi and 20 psi. The gas was held in the cell 10 as a static system (no flow), although fresh gas could be allowed to flow through it for flushing.

It is interesting to note that neither $D_2$ flushing nor heating/cooling had any effect on gamma output when re-measured immediately afterward.

TABLE III

| DAY | CPM | POWER | D.C. VOLTS | AMPS |
|---|---|---|---|---|
| 36 | 1578 | 5 | 10 | 0.5 |
| 37 | 1618 | 5 | 10 | 0.5 |
| | | Power on all night at 2.5 W | | |
| 37 | 1489 | 5 | 10 | 0.5 |
| 38 | 1608 | 5 | 10 | 0.5 |
| 39 | 1692 | 0 | | |

TABLE III-continued

| DAY | CPM | POWER | D.C. VOLTS | AMPS |
|---|---|---|---|---|
| 40 | 1835 | 5 | 10 | 0.5 |
| 41 | 1938 | 5 | 10 | 0.5 |
| 46 | 2076 | 0 | | |
| 47 | 1964 | 5 | 10 | 0.5 |
| 48 | 2043 | 5 | 10 | 0.5 |
| 53 | 2219 | 0 | | |
| 55 | 2133 | 5 | 10 | 0.5 |
| 56 | 2154 | 5 | 10 | 0.5 |
| | | R drops to ~5 ohm | | |
| 57 | 2007 | 5 | 5 | 1 |
| 58 | 2029 | 5 | 5 | 1 |
| | | R drops to ~2 ohm | | |
| 59* | 2082 | 2 | 2 | 1 |
| 60 | 2017 → 1521 (5.5 hrs P on) | 8.3 | 1.85 | 4.5 |
| | | R drops to ~0.4 ohm @ temp −160 C. | | |
| 61 | 1559 | 0 | | |
| 62 | 1459 | 6.6 | 1.65 | 4.0 |
| 63 | 1620 | 8.7 | 1.93 | 4.5 |
| 64 | 1704 | 9.5 | 2.12 | 4.5 |
| 65 | 1670 | 9.45 | 2.10 | 4.5 |
| 66 | 1921 | 0 | | |
| 67 | 1871 | 8.64 | 1.92 | 4.5 |
| 68 | 2042 | 0 | | |
| 70 | 2143 | 8.55 | 1.90 | 4.5 |
| 71 | 2060 | 8.78 | 1.95 | 4.5 |
| 72 | 2063 | 0 | | |
| 73 | 1930 | 8.6 | 1.91 | 4.5 |
| 74 | 1770 | 8.64 | 1.92 | 4.5 |
| 75 | 2028 → 1780 (8 hrs P on) | 8.64 | 1.92 | 4.5 |
| 76 | 2021 | 0 | | |
| 77 | 2229 | 0 | | |
| 80 | 2014 | 8.15 | 1.87 | 4.53 |
| 81-82 | 2030 → 1707 (32 hrs P on) | 8.42 | 1.85 | 4.55 |
| 83 | 1957 | 0.36 | 0.36 | 1.0 |
| 84 | 1714 → 930 | 3.33 | 1.11 | 3.0 |
| 85 | 991 → 884 (8 hrs P on) | 0.38 | 0.38 | 1.0 |

*After the 59th day, the power supply was changed to Norbatron DCR 150-10 in order to attain a higher amperage at low CELL 10 resistances; the Lodestar was only capable of 3.0 amps.

Discussion

A literature search, along with talks with nuclear physicists and a medical radiologist, have yielded no reasonable explanation to explain the drop in cell 10 gamma output Argon is known to have a high solubility in Pd [see Mellor, A Comprehensive Treatise on Inorganic and Theoretical Chemistry, 1932, pg. 616], and one would reasonably expect radon to have at least some solubility. This would not necessarily block gamma emissions however. Indeed, gamma emissions are seen to increase in the closed cell 10 before the addition of $D_2$ and power application.

Once daughter isotope (secular) equilibrium has been reached, the only known way to reduce, or change, the gamma output of the source is to bombard it with neutrons (usually causing counts to increase). Since PB-214 and Bi-214 are the strongest gamma emitters in the series, then it is predominantly their radiation that is being counted. These two radioisotopes also come to secular equilibrium in about 38 days (ie, approximately ten half-lives of radon-222). If Pb-214 and BI-214 levels are somehow reduced by the combination of $D_2$ and electron flux (in the presence of nano-Pd and ZrO particles), then this would account for the observed data. However, nearing the end of the experiment (when the counts are less than 1320), it seems to appear possible that the Ra-226 itself has been affected. Gamma ray spectroscopy could be used to answer this important question.

Other metal oxides may be used as a carrier catalyst such as $TiO_2$, $Z_nO_2$, $C_aO$, $N_iO$ and $B_aO$, so long as they are not reducible by $H_2$ or $D_2$ at temperatures less than in the range of 400° C. (cell operating temperature).

Since the glass tube of the cell 10 (containing the powder) has a1.0 cm ID, then the electron flux through the cross-sectional area of the powder is 3.57×10^19 electrons per second at 4.5 amps. Increasing the current, while cooling the cell 10, would certainly be worth investigating (the glass should be used below 400C. This would increase the "concentrated negativity" in the powder, a parameter that seems to have an effect on the gamma decrease. Certainly, it is known that simply heating radioactive matter in a furnace has no bearing on it's radiation output. An increase in powder radioactivity, as well as trying other radioactive materials (especially some without radioactive daughters), would be very interesting.

This experiment will be repeated again with a more sensitive gamma ratemeter. A new Scintillation counter, including a PRS-5 Scaler/Ratemeter/Analyzer and a PGS-3 Gamma Scintillation Probe with a bismuth germinate 1" thick was used in the experiment herebelow. In the repeated experiment, as reported in Table I below, the results generally mirrored the above experiment.

This above experiment was again repeated using alternating current (a.c.). Again, a significant reduction (5.6%) in gamma ray emissions was realized in less than 7 hours of testing.

TABLE V

SCINTILLATION COUNTER DATA Ra CELL

| Day | CPM | Power | Volts (DC) | Amps | Comments |
|---|---|---|---|---|---|
| 1 | 30610 | 0 | 0 | 0 | |
| 2 | 30253 | 0 | 0 | 0 | |
| 4 | 29949 | 0 | 0 | 0 | |
| 5 | 30330 | 0 | 0 | 0 | |
| 6 | | | | | $D_2$ Flush/fill to 20 psi |
| 6 | 29145 | 0 | 0 | 0 | |
| 6 | 28533 | 10.45 | 2.75 | 3.80 | (during warmup) |
| 6 | 26664 | | | | (3 hrs. on) T ~187° C. |
| 7 | 28112 | 0 | 0 | 0 | |
| 7 | 27388 | 9.57 | 1.91 | 5.01 | (during warmup) |
| 7 | 25153 | 8.9 | 1.75 | 5.07 | (7 hrs. on) T ~190° C. |
| 8 | 26778 | 0 | 0 | 0 | |
| 8 | 26372 | 10.2 | 1.93 | 5.30 | (during warmup) |
| 8 | 24104 | 9.35 | 1.69 | 5.53 | (7 hrs. on) |
| 9 | 26223 | 0 | | | |
| 9 | 25609 | 9.94 | 1.84 | 5.1 | (during warmup) T~184° C. |
| 9 | 24850 | 9.94 | 1.84 | 5.1 | (8 hrs. on) T ~184° C. |

Observation: ~17% reduction

TABLE V

A.C. VOLTAGE TRIAL ($60H_3$, Sine wave)

| Day | CPM | Power | Volts (AC) | Amps | Comments |
|---|---|---|---|---|---|
| 1 | 25965 | 0 | 0 | 0 | |
| 1 | | | | | $D_2$ flush/fill to 20 psi |
| 1 | 25777 | 0 | 0 | 0 | |
| 1 | 25560 | 10.25 | 1.85 | 5.54 | (during warmup) |
| 1 | 24623 | 9.94 | 1.82 | 5.46 | (6 hrs. on) |

Observation: ~5.6% reduction

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. An electrolytic cell comprising:

a non-conductive housing open at each end thereof;

a conductive end member sealingly positioned in and extending from each said open end of said housing, said end members having spaced apart proximal ends to define, in cooperation with said housing, a chamber therebetween;

catalytic particles closely packed into said chamber and against each said proximal end, said catalytic particles comprising a uniform mixture of nano-palladium powder, zirconium oxide powder, and a gamma ray emitting material;

an end plate positioned against a distal end of each said end members, said end plates adjustably held together and against said distal ends whereby the length of said chamber and the degree of compression of said particles is adjustably established;

a longitudinal gas passage extending through each said end member in gas communication with said chamber, each of said gas passages being sealably closeable, one said gas passage being connectable to a source of pressurized hydrogen or deuterium gas deliverable under pressure into said chamber;

a distal end of each said end member being connectable to an electric power source wherein, when electric current flows through said end members and said chamber which is filled with said catalytic particles and said gas, gamma ray emissions from said gamma ray emitting material decays substantially faster than a known decay right therefor.

2. A gamma ray reduction apparatus for accelerating the radioactive decay of a radioactive material, comprising:

a chamber including non-conductive side walls and spaced apart electrically separated conductive end surfaces defining said chamber;

catalytic particles closely packed into said chamber and against each said conductive end surface, said catalytic particles comprising a uniform mixture of palladium black powder and inert non-conductive zirconium dioxide particles, and a gamma ray emitting material;

a longitudinal gas passage in gas communication with said chamber, said gas passage being connectable to a source of pressurized hydrogen ($H_2$) or deuterium ($D_2$) gas deliverable into said chamber for charging said conductive particles and for filling said chamber prior to operation of said apparatus;

each said end surface being connectable to an electric power source wherein, when electric current flows through said chamber, said catalytic particles and said gas, heat is produced within said chamber for external use and gamma ray emissions from said gamma ray emitting material decays substantially faster than a known decay rate therefor.

3. A method of accelerating the radioactive decay of a gamma ray emitting substance comprising:

A. providing an apparatus comprising:

a chamber including non-conductive side walls and spaced apart electrically separated conductive end surfaces defining said chamber;

catalytic particles closely packed into said chamber and against each said conductive end surface, said catalytic particles comprising a uniform mixture of palladium black powder, inert non-conductive particles, and a gamma ray emitting material;

a longitudinal closeable gas passage in gas communication with said chamber;

B. connecting said gas passage to a source of pressurized hydrogen ($H_2$) or deuterium $D_2$ gas and delivering said gas into said chamber for charging said conductive particles and for filling said chamber prior to operation of said apparatus;

C. applying an electric power source to each said end surface wherein electric current flows through said chamber, said catalytic particles and said gas;

D. monitoring the gamma ray emissions from said catalytic particles while operating said apparatus until the gamma ray emissions are substantially reduced.

* * * * *